United States Patent
Honma

(10) Patent No.: US 7,400,427 B2
(45) Date of Patent: Jul. 15, 2008

(54) PRINTING CONTROL DEVICE, PRINTING CONTROL SYSTEM, AND PRINTING CONTROL METHOD

(75) Inventor: Tomoyuki Honma, Yamatokoriyama (JP)

(73) Assignee: Sharp Kabushiki Kaisha (JP)

( * ) Notice: Subject to any disclaimer, the term of this patent is extended or adjusted under 35 U.S.C. 154(b) by 930 days.

(21) Appl. No.: 10/754,787

(22) Filed: Jan. 8, 2004

(65) Prior Publication Data

US 2004/0141203 A1 Jul. 22, 2004

(30) Foreign Application Priority Data

Jan. 17, 2003 (JP) ............................. 2003-010260

(51) Int. Cl.
*G06K 15/00* (2006.01)
(52) U.S. Cl. ...................... 358/1.15; 358/1.16; 358/1.18
(58) Field of Classification Search ................ 358/1.13, 358/1.14, 1.15, 1.16, 1.18, 471; 379/100.01
See application file for complete search history.

(56) References Cited

U.S. PATENT DOCUMENTS 6,597,469 B1 * 7/2003 Kuroyanagi ............... 358/1.15
7,075,670 B1 * 7/2006 Koga ......................... 358/1.15

FOREIGN PATENT DOCUMENTS

| JP | 06202827 | * | 7/1994 |
| JP | 10222324 | * | 8/1998 |
| JP | 2000-330742 | | 11/2000 |
| JP | 2002-103753 | | 4/2002 |
| JP | 2003186639 | * | 7/2003 |

* cited by examiner

*Primary Examiner*—Jerome Grant, II
(74) *Attorney, Agent, or Firm*—David G. Conlin; George N. Chaclas; Edwards Angell Palmer & Dodge LLP

(57) ABSTRACT

A printing control system of the present invention is arranged so as to control a printing process to be executed by a printer by a printer driver installed in a host computer. The host computer stores information on restricted function in HD for controlling the printing process to be executed by a computer. The printer driver includes a detecting section for detecting the information on the restricted function, and a defining section for defining as print controlling conditions, the print processing function available in the print processing based on the information on restricted function as defected by said detecting section. With this structure, it is possible to define the setting of the print controlling conditions in the printing device for each user.

24 Claims, 11 Drawing Sheets

| PRINTER NAME | PRINTER 20 | PRINTER 30 |
|---|---|---|
| RESTRICTION OF FUNCTION | FEED TRAY 4 | COLOR PRINT |
| HOST A | × | ○ |
| HOST B | ○ | ○ |
| HOST C | × | ○ |
| HOST D | × | ○ |
| HOST E | × | × |

FIG. 8 (a)

| PRINTER NAME | PRINTER 20 | PRINTER 30 |
|---|---|---|
| RESTRICTION OF FUNCTION | FEED TRAY 4 | COLOR PRINT |
| HOST X | 20 SHEETS/MONTH | 50 PAGES/MONTH |
| HOST B' | 20 SHEETS/MONTH | 50 PAGES/MONTH |
| HOST C' | 10 SHEETS/MONTH | 30 PAGES/MONTH |
| HOST D' | 10 SHEETS/MONTH | 30 PAGES/MONTH |
| HOST E' | 0 SHEET/MONTH | 0 PAGE/MONTH |

FIG. 8 (b)

| PRINTER NAME | PRINTER 20 | PRINTER 30 |
|---|---|---|
| RESTRICTION OF FUNCTION | FEED TRAY 4<br>20 SHEETS/MONTH | COLOR PRINT<br>50 PAGES/MONTH |
| PERFORMANCE | 11 | 37 |

PRINTING CONTROL DEVICE, PRINTING CONTROL SYSTEM, AND PRINTING CONTROL METHOD

This Non-provisional application claims priority under 35 U.S.C. § 119(a) on Patent Application No. 2003/010260 filed in Japan on Jan. 17, 2003, the entire contents of which are hereby incorporated by reference.

FIELD OF THE INVENTION

The present invention relates to a printing control device connected to a printing device via a network, that makes the printing device execute a printing process, a printing control system that permits a printing control condition to be set in the printing device for each user, for example, by a printer driver, and also relates to a printing control method.

BACKGROUND OF THE INVENTION

In recent years, network connectable printers that can accept print jobs from a plurality of host computers linked in a LAN (Local Area Network) or other network have become prevalent, for example, in offices. In the case of adopting the foregoing network connectable printer, a host computer installs a printer driver for the control of the printing process at the printer (for example, as disclosed, in Patent Document 1: Japanese Laid-Open Patent Publication No. 2000-330742/2000 (Tokukai 2000-330742, published on Nov. 30, 2000)). The printer driver as installed serves as a program for controlling the printing on the host computer, and printing conditions in the printing process can be set by setting the printer driver.

The printer used in common among a plurality of host computers may be subjected to various restrictions on the print processing functions of the printer when carrying out a printing operation in consideration of users' preferences, efficiencies of a printing operation in the printer, etc.

For a printer in which a restriction on the printable number of pages in color print is set for each user, adopted, for example, is the structure wherein in an event that a set number of pages to color print is greater than the printable number of pages in the user's request for color print, the printing condition is changed automatically from color print to monochrome print, and a printing operation is executed in monochrome (for example, as disclosed, in Patent Document 2: Japanese Laid-Open Patent Publication No. 2002-103753/2002 (Tokukai 2002-103753, published on Apr. 9, 2002)). It may be also arranged such that in order to restrict the usable recording sheet, the use of the feed tray provided in the printer is restricted for each user. In such printer, upon making a request for a printing operation in which an unavailable feed tray is selected, the set condition for a feed tray is changed automatically to an available feed tray, and the printing operation is executed.

As another example, there is a printer wherein in the case where a request for both-sided printing operation is made by a user who has a permission for only under-printing, the set printing condition is changed automatically from the both-sided printing to the under-printing, thereby executing a under-printing operation.

As described, for a printer in which the print processing function is restricted for each user, in the case where a request for a printing operation is made with a print processing condition that is not permitted, printing conditions are changed automatically so that the printing operation is executed using a permitted print processing function.

However, as described in the foregoing printers, the printing conditions as requested by the user are changed automatically, and therefore, the printing operation may not be performed with the conditions desired by the user.

Specifically, for example, in the case where a request for color print is made with respect to a printer in which a color print is restricted, the condition is changed automatically from the color print to the monochrome print as described above. In this case, however, data for color print is still transmitted to the printer. Generally, the amount of data for color print is larger than the amount of data for monochrome printing, and therefore, it takes time to obtain a monochrome print. Besides, in the case where the printing conditions are changed automatically from the color printing to the monochrome printing, a file for monochrome printed sheets is prepared, and the printing conditions are set by the printer driver automatically, thereby presenting the problem that printed outputs as desired by the user may not be obtained.

Furthermore, in the case where the feed tray is changed automatically with the restriction on the print processing function, the feed tray as set automatically may not be the one the user desires. Similarly, for the printer in which a printing condition is charged automatically from the both-sided printing to the under-printing, and the printing operation in the under-printing is performed, the user may desire to change the print condition to multi-shot printing in which plural pages are printed on one under-sheet.

As described, according to the foregoing structure wherein the printing conditions are changed automatically, an unnecessary longer time is required for the printing operation, or the printing operation may not be performed with the printing condition as user desires.

Incidentally, the patent document 1 discloses the structure wherein the printer driver is installed automatically in the host computer; however, it fails to disclose the structure wherein a restriction on a print processing function is set for each host computer (user), or the structure wherein the print processing function is restricted on the printer driver.

SUMMARY OF THE INVENTION

The present invention is achieved in finding a way to solve the foregoing problems, and it is therefore an object of the present invention to provide a printing control device, a printing control system and a printing control method, that permit the setting of print controlling conditions to be set in the printing device to be defined for each user. It is another object of the present invention to provide a printing control device, a printing control system and a printing control method wherein when a need arises to change a printing condition in a requested printing process for a restriction on a print processing function in the printing process as defined for each user, the user can select a print processing function as desired from print processing functions that are not restricted, without automatically changing to the printing condition set beforehand.

In order to achieve the foregoing object, a printing control device of the present invention connected to a printing device via a network, for controlling a printing process to be executed by the printing device, is characterized by including:

a storage section for storing information on restricted function, for restricting a use of a print processing function of the printing device;

a detecting section for detecting the information on restricted function; and a defining section for defining as a print controlling condition, a print processing function available in the printing process based on the information on restricted function as detected by the detecting section.

In order to achieve the foregoing object, the printing control system of the present invention, provided with a printing device and a printing control device for controlling a printing process to be executed by the printing device, is arranged such that the printing control device includes:

a storage section which stores therein information on restricted function for restricting a use of a print processing function of the printing device;

a detecting section for detecting the information on restricted function; and a defining section for defining as a print controlling condition, a print processing function available in the printing process based on the information on restricted function as detected by the detecting section.

The foregoing structure wherein the detecting section detects the information on the restricted function as stored in the printing control device offers the effect of defining a printing control condition with a predetermined restricted print processing function for each printing control device. As a result, it is possible to restrict a printing process to be executed in the printing device for each printing control device.

Furthermore, the user of the printing control device can recognize the print processing conditions available in the printing process without restriction and restricted print processing conditions. It is therefore possible for the printing control device to control the printing process at the printing device so as to execute a printing process as desired by the user based on the option selected by the user among the available printing conditions.

The detecting section and the defining section may be realized by a hardware, or may be realized by making a computer execute the software. The present invention can be realized, for example, by a printer driver installed in an information processing device including a computer, which makes a computer function as the detecting section and the defining section, a computer-readable recording medium having recorded thereon the printer driver and a computer data signal in a carrier wave modulated by the printer driver.

In order to achieve the foregoing object, the printing control method of the present invention is characterized by including:

a detecting step for detecting information on restricted function for restricting a print processing function of the printing device as stored in the information processing device; and a defining step for defining as print controlling conditions the print processing function available in the printing process based on the information on restricted function as detected in the detecting step.

The foregoing structure of the present invention offers the effect of restricting a printing process to be executed by the printing device for each information processing device by the printer driver. Then, by selecting at least one print processing function from the printing control conditions, it is possible to control a printing process in the printing device so as to execute the printing process as user desires.

In order to achieve the foregoing object, a print controlling system which controls a printing process to be executed by a printing device by installing therein a printer driver in an information processing device from the server via the network, wherein:

the printer driver includes a printer driver module corresponding to each print processing function of the printing device;

the server has the printer driver, and includes a control section which controls the information on restricted function for restricting the use of the print processing function of the printing device, and the server provides the printer driver module having a specific print processing function based on the information on the restricted function.

According to the foregoing structure, the printer driver module is installed for each information processing device based on the information on restricted function. Therefore, the printing process to be executed at the printing device in response to the request from the information processing device is performed with the print processing function corresponding to the printer driver module. Namely, by installing a specific printer driver module from the server in the information processing device, it is possible to restrict the printing process to be executed at the printing device according to the printer driver module.

For a fuller understanding of the nature and advantages of the invention, reference should be made to the ensuing detailed description taken in conjunction with the accompanying drawings.

BRIEF DESCRIPTION OF THE DRAWINGS

FIG. 8(*a*) is a control table, which shows one example of information on restricted function controlled in the printer driver control section of the server;

FIG. 8(*b*) is a table which shows one example of a function setting file controlled in a restricted function control section of the host computer;

DESCRIPTION OF THE EMBODIMENTS

First Embodiment

The following descriptions will explain one embodiment of the present invention in reference to FIG. 1 to FIG. 6.

Figure 2:
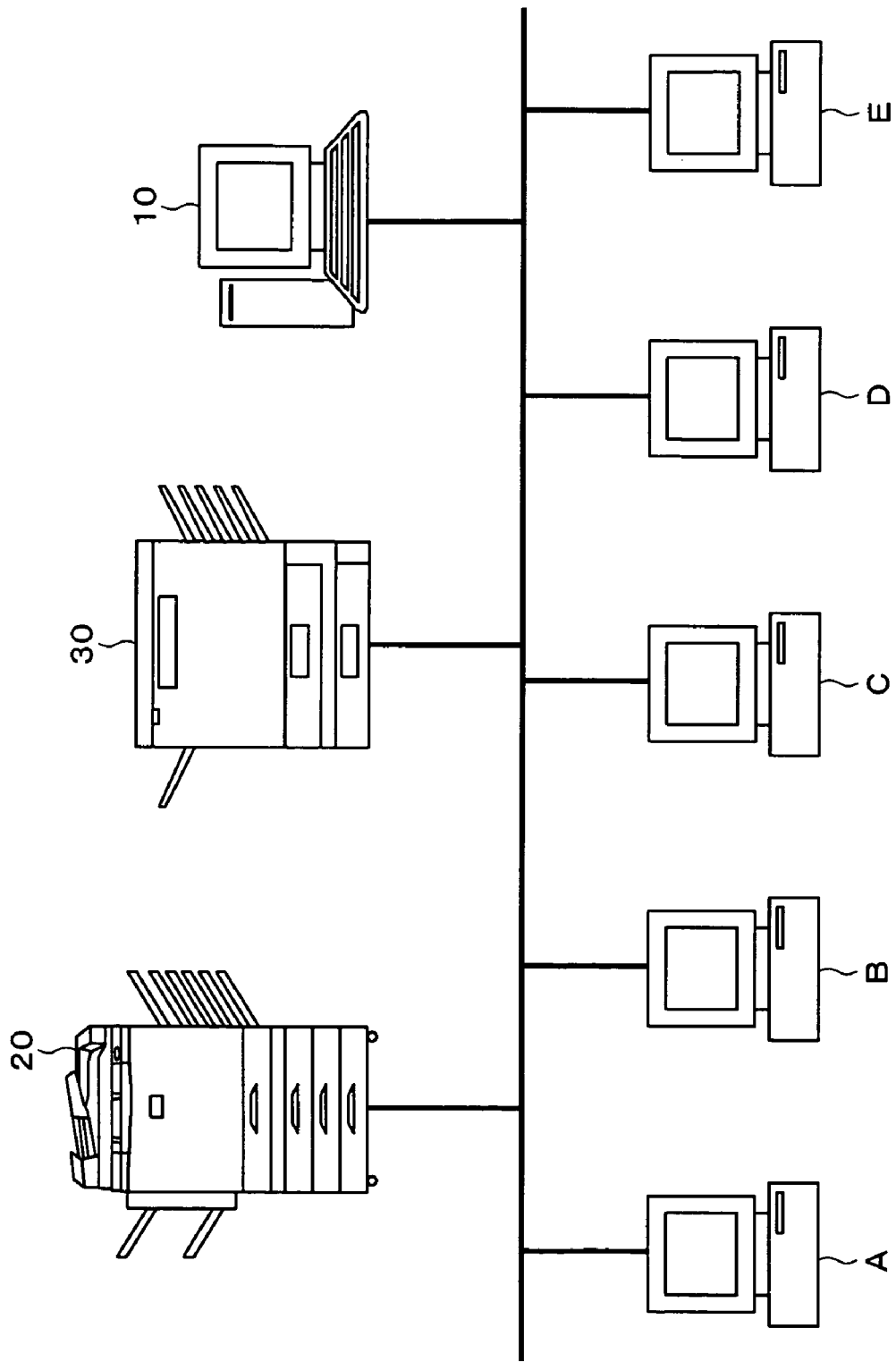
FIG. 2 is a front view that explains schematic structures of a printer network system of the present invention.

As illustrated in FIG. 2, a printer network system (printing control system) in accordance with the present embodiment includes a server 10, printers 20 and 30 (printing device) and host computers (hereinafter referred to as hosts) A to E (printing control device) that are mutually connected via a local area network (LAN) 40 (network).

Figure 1:
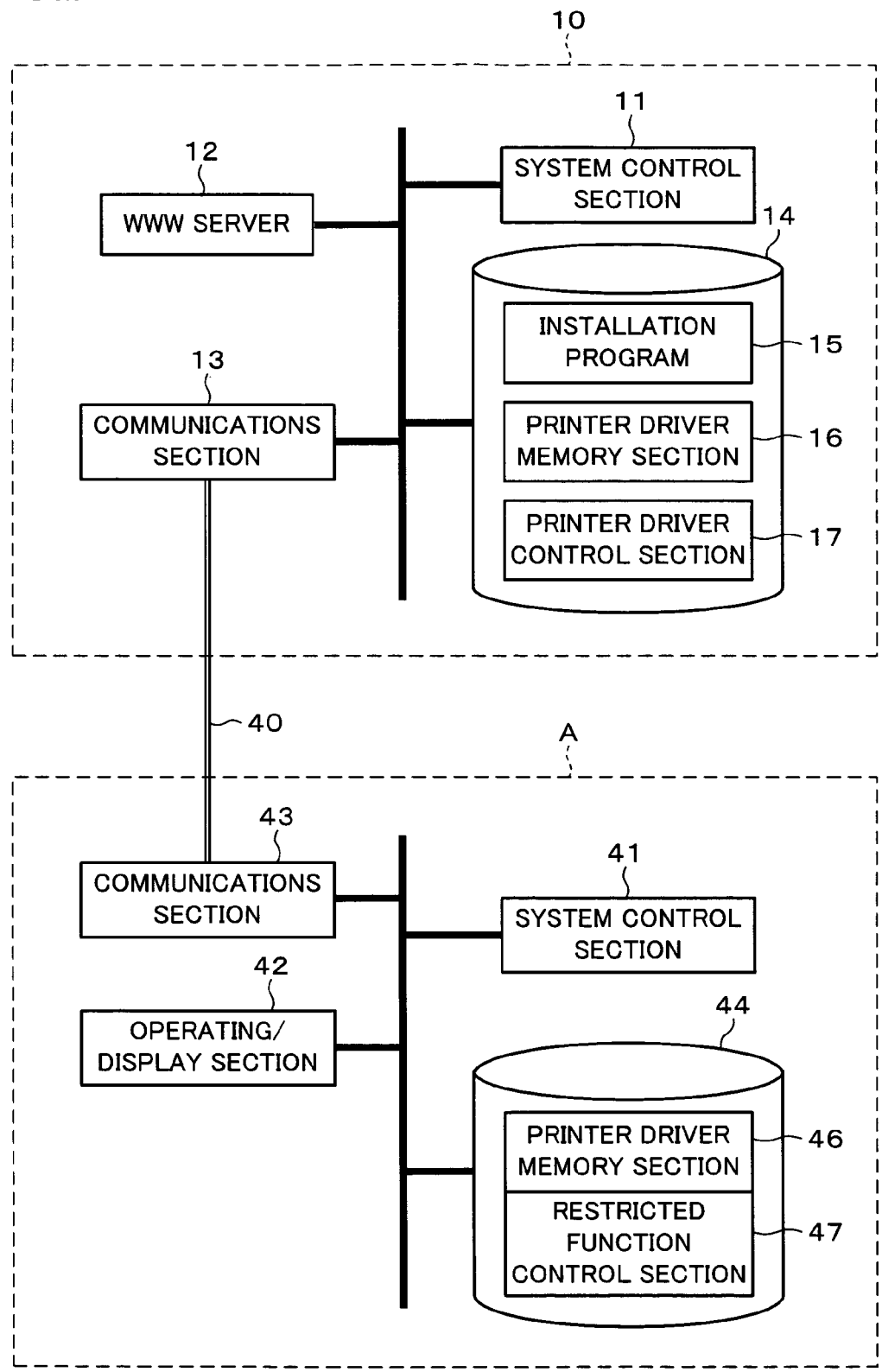
FIG. 1 is a block diagram of a server and a host computer that constitute a printer network system of the present invention.

As illustrated in FIG. 1, the server 10 includes a system control section 11, a WWW (World Wide Web) server 12, a communications section 13 and a hard disk (hereinafter referred to as HD) 14.

The system control section 11 controls the server 10 on the whole, and controls operations of the WWW server 12, the control section 13 and the HD 14. The WWW server 12 controls the Web information to be provided via the network. The communications section 13 connect the server 10 and hosts A to E or the printers 20 and 30 (FIG. 2) via a network such as the LAN 40, etc.

The HD 14 may be ROM (Read Only Memory), RAM (Random Access Memory) or other memory means. The HD 14 stores an install program 15. The HD 14 includes a printer driver memory section 16 and a printer driver control section 17.

Incidentally, the printer driver control section 17 may be a different server from the server 10.

The install program 15 is provided for installing a printer driver to be described later from the server 12 to the hosts A to E respectively. This install program 15 is executed in response to a request for installation from the Host A to E.

The printer driver memory section 16 stores therein the printer driver corresponding to various printers such as printers 20 and 30 shown in FIG. 2. The printer driver stored in this printer driver memory section 16 may be stored via a storage medium such as a floppy (registered trademark) disk, etc., or stored by receiving it via a network such as an internet, etc.

Furthermore, the printer driver control section 17 stores as information on restricted function for each of the hosts A to E, print processing functions to be restricted of all the functions related to print processes of each of the printers 20 and 30. The print processing functions include color print function, monochrome print function, both-sided printing process, stapling process of sheets having gone through the printing process, multi-shot printing process, selecting a feed tray to be used, selecting a discharge tray for discharging thereon sheets of printed material.

Figures 3, 4:
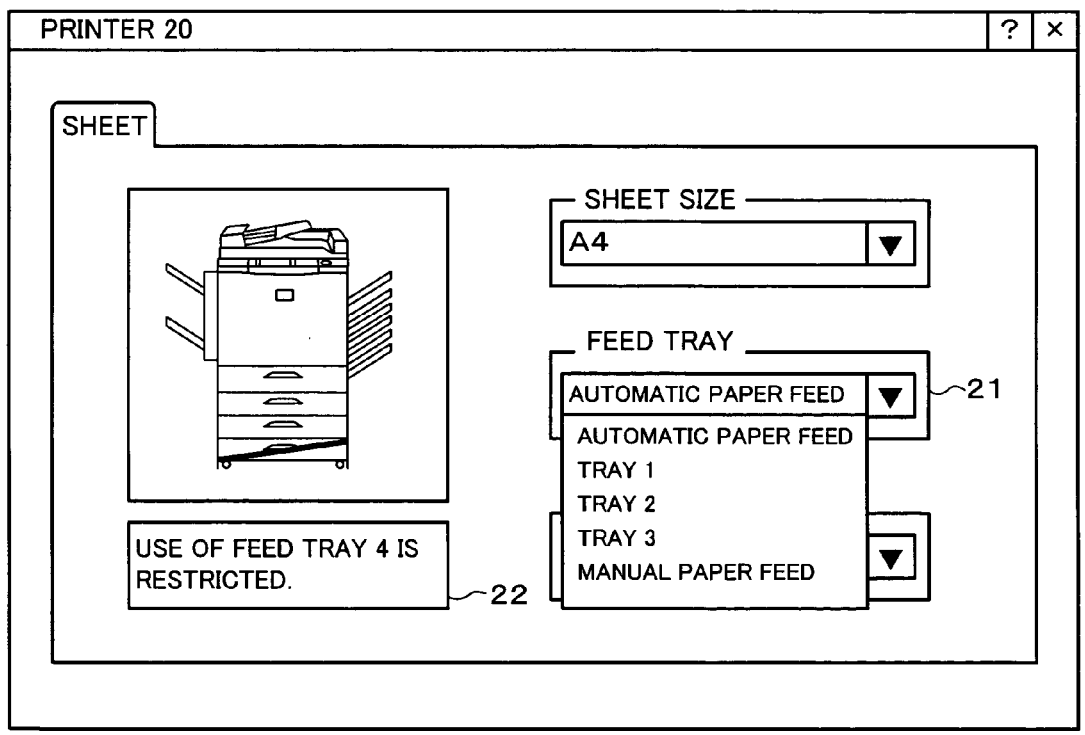
FIG. 3 is a control table that shows one example of information on restricted function controlled in a printer driver control section of the server.
FIG. 4 is a plan view that shows a print setting dialog screen created by a printer driver installed in a host computer.

The information on restricted function is used for restricting (prohibiting) the use of at least one of the print processing functions with respect to at least one of the hosts. As illustrated in FIG. 3, for example, the information on restricted function is controlled by a control table in which information on restricted function are listed for each of the printers 20 and 30, and the hosts A to E. According to the information on restricted function managed in the control table shown in FIG. 3, the printing process adopting the recording sheets stored in the feed tray 4 of the printer 20 is permitted (○ in FIG. 3) for the host A and is not permitted for the hosts C to E (X in FIG. 3). For the information on restricted function of each of the hosts A to E set for each of the printers 20 and 30 adopting the control table is down loaded at the same time when down loading the printer driver to each of the hosts A to E.

Incidentally, the control table shown in FIG. 3 is set beforehand for the manager of the printers 20 and 30, and the manager of the server 10. Therefore, the information on restricted function is not limited to the one shown in FIG. 3, and also the structure of the control table is not limited to the one shown in FIG. 3. Namely, for the information on restricted function, those for restricting the stapling process, or restricting the both-sided printing process may be adopted.

Similarly, for the control table, it may be arranged so as to list up the hosts that are free from the restriction of the functions.

Incidentally, the control table is prepared in such a manner that the printer driver control section 17 dynamically obtains the print processing functions such as options, etc., from each of the printer drivers 20 and 30, and the manager then sets the information on restricted function, etc., based on the print processing functions thus obtained. For example, it may be arranged such that in the case where the printer 20 cannot execute color printing, the printer driver control section 17 obtains information that the color print is restricted in the printer 20, and the function of color print is not displayed in the setting screen. It may be arranged such that the manager sets the information on restricted function in each host merely by selecting the restricted functions from the functions of the printer 20.

As illustrated in FIG. 1, the host A includes a system control section 41, an operating/display section (user interface) 42, a communications section 43, and a hard disk (hereinafter referred to as HD) 44. Incidentally, although not shown, the host A is provided with a CPU. (Central Processing Unit) and a memory.

FIG. 1 and in the explanations of FIG. 1, the host A is adopted. However, the structure of FIG. 1 and the following explanations can be applied to other hosts B to E than the host A.

The system control section 41 is provided for controlling the host A, specifically for controlling an operation/display section 42, the communications section 43 and the HD 44.

The operating/display section 42 corresponds to input means such as a keyboard, a mouse, etc., for receiving instructions from the user; display means such as a liquid crystal display, a CRT display, etc. The operating/display section 42 is made up of a display device (display means) for displaying a print setting dialog screen which indicates a plurality of print processing functions of each of the printers 20 and 30, and an input device (input means) which permits the user to select the print processing function as desired among a plurality of functions (plurality of print processing functions) displayed in the print setting dialog screen.

The communications section 43 is arranged so as to connect the host A, the server 10 and the printers 20 and 30 via the network such as LAN 40.

The HD 44 may be ROM (Read Only Memory), RAM (Random Access Memory) or other memory means. The HD 44 includes a printer driver memory section 46 and a restricted function control section 47.

The printer driver memory section 46 stores therein a printer driver corresponding to each printer installed from the server 10. The restricted function control section 47 stores a restricted function control file as prepared based on the information on restricted function downloaded from the printer driver control section 17.

The printer driver as being installed in the host A operates as a program for controlling printing on the host A. Although not shown, the printer driver includes a detecting section for detecting the restricted function control file (to be described later) to be read out from the restricted function control section 47, a regulating section for regulating the printing function that can be used for printing as print controlling conditions based on the restricted function control file as read, and an informing section for informing the user of the print controlling conditions and the print processing functions (hereinafter referred to as control functions), etc., subjected to the restricted function, and cannot be used in the printing process. By selecting the print processing function as desired by the user among the print controlling conditions set by the printer driver, the print conditions in the printing condition can be set. The informing section also has a function of modifying the user interface to prohibit the use of the print processing function restricted to use by the user. The informing section informs the user of the print processing function available in the printing process so as to prevent the user from selecting the print processing function that is prohibited to use.

The printer driver is a program for making the computer function as the detecting section, the regulating section and the informing section. In other words, the printer driver is a program, which makes a computer execute the detecting step for detecting the information on restricted function stored in the information on restricted function stored in the restricted function control section 47, a defining step for defining the print processing function that can be used in the printing process, and an informing step for informing the user of the print processing function that can be used for the printing process so as to prevent the print processing function which is prohibited to use from being selected.

Incidentally, the printer driver is provided for each of the printers 20 and 30, and generally, the same printer driver is installed in the hosts A to E, respectively.

In the printer network system having the foregoing structure, the operation of installing the printer driver of the printer 20 in the host A from the server 10 is performed in the following manner. Namely, via the LAN 40, the host A makes an access to the server 10 to request for the installation of the printer driver of the printer 20. With this request, the installation program 15 stored in the HD 14 of the server 10 is executed.

With this installation program 15, the printer driver for the printer 20 stored in the printer driver memory section 16 is downloaded in the printer driver memory section 46 in the HD 44 of the host A. In the meantime, among the information on restricted function (FIG. 3) stored in the printer driver control section 17, the information on restricted function (FIG. 3), that is restricted to use when the host A uses the printer 20 is downloaded in the printer driver storage section 46. This information on restricted function is once stored in the HD 44 of the host A.

Upon completing the downloading of the printer driver and the function setting file, the printer driver is installed in the host A. Upon completing the installation of the printer driver in the host A, the steps of preparing a part for setting an IP address, etc., of the printer 20 corresponding to the printer driver, or setting a default value of the printer driver are performed.

Next, based on the function setting file stored in the HD 44, prepared is the restricted function control file including the information on restricted function on the function when the host A uses the printer 20. The restricted function control file is stored in the restricted function control section 47 in the HD 44 of the host A.

When a request for the printing process is made with respect to the printer 20, for example, an application software of the host A in which the printer driver of the printer 20 is installed, the printer driver in the host A is activated. In response, the detecting section of the printer driver reads the restricted function control file from the restricted function control section 47, and confirms the print processing function that is restricted to use when adopting the printer 20.

As described, the restricted function control file is prepared based on the control table of FIG. 3. Therefore, in the restricted function control file for restricting the use of the feed tray 4 is described when the host A uses the printer 20. Therefore, based on the restricted function control file, the defining section of the printer driver defines as the print controlling condition the print processing function that is not restricted to use and that can be set in the printing process. Based on the print controlling condition, the informing section of the printer driver creates a print setting dialog screen to be described later and displays the print setting dialog screen in the operating/display section 42 of the host A. In the print setting dialog screen, the function that is restricted to use in the printing process is indicated in the display to be unselectable, and the print processing function that is not restricted to use in the printing process is indicated in the display to be selectable.

Specifically, in the sheet setting use print setting dialog screen for setting the recording sheet to be used in the printing process such as a sheet size, feed tray, etc., as illustrated in FIG. 4, in the selection box 21 for selecting the feed tray, "the tray 4" indicative of the feed tray 4 is not displayed, and a message "The feed tray 4 is being used." is displayed in a message area 22. As a result, in the case where the host A is to execute the printing process using the printer 20, the user can recognize that the use of the recording material stored in the feed tray 4 of the printer 20 is restricted.

In the print setting dialog screen shown in FIG. 4, the selective modes are displayed to allow the user to set a mode as desired, i.e., "automatic feed" in which a feed tray that is not restricted to use is automatically selected, "tray 1" in which the feed tray 1 is selected, "tray 2" in which the feed tray 2 is selected, "tray 3" in which the feed tray 3 is selected, and "manual feed" in which a manual feed tray is selected. Among the feed trays displayed in the selection box 21, the feed tray that can be used in the printing process can be set by selecting a feed tray as desired. Namely, in this case, even when the one of the print processing functions (printing processes using a recording material stored in the feed tray 4) is restricted, the user is permitted to select the print processing function as the user desires among a plurality of print processing functions that are not restricted to use (the printing process adopting the recording material stored in the feed tray as automatically selected from the feed trays 1 to 3, three types of printing processes adopting the recording material stored in the feed trays 1 to 3 respectively, and the printing process adopting the recording material stored in the manual tray).

As described, the printer driver reads the restricted function control file. In response, in the print setting dialog screen of the printer driver, only the print controlling conditions that are not restricted to use ("automatic feed", "tray 1", "tray 2", "tray 3", and "manual feed") are displayed, and print controlling condition "tray 4" which is restricted to use is not displayed. In this way, the user can be prevented from selecting the tray 4 that is restricted to use, by mistake. The user can set the printing conditions by selecting a print controlling condition as desired among the selectively displayed plurality of print controlling conditions, and the printing condition is set by selecting the print processing function as desired.

In the present embodiment, a message indicating that the use of the feed tray 3 is restricted is displayed. It may be arranged such that the tray 4 may be in the message area 22 in the print setting dialog screen. It may be arranged so as to display in the selection box 21 "tray 4" indicative of the feed tray 4 to be un-selectable. For example, "tray 4" is gray out displayed in the selection box 21 so as to inform the user of that the use of the feed tray 4 is restricted. In the case where "tray 4" is gray out displayed, the printing conditions selecting the feed tray 4 cannot be set, and the user therefore can be prevented from setting the printing conditions using the feed tray 4 by mistake.

Specifically, the printing conditions are displayed in the print setting dialog screen in such a manner that available printing control functions are selectively displayed, and unavailable printing control functions are unselectively displayed. In this way, it is possible to inform the user of the restricted functions, and it is possible to prevent the user from selecting the restricted function by mistake.

Figure 5:
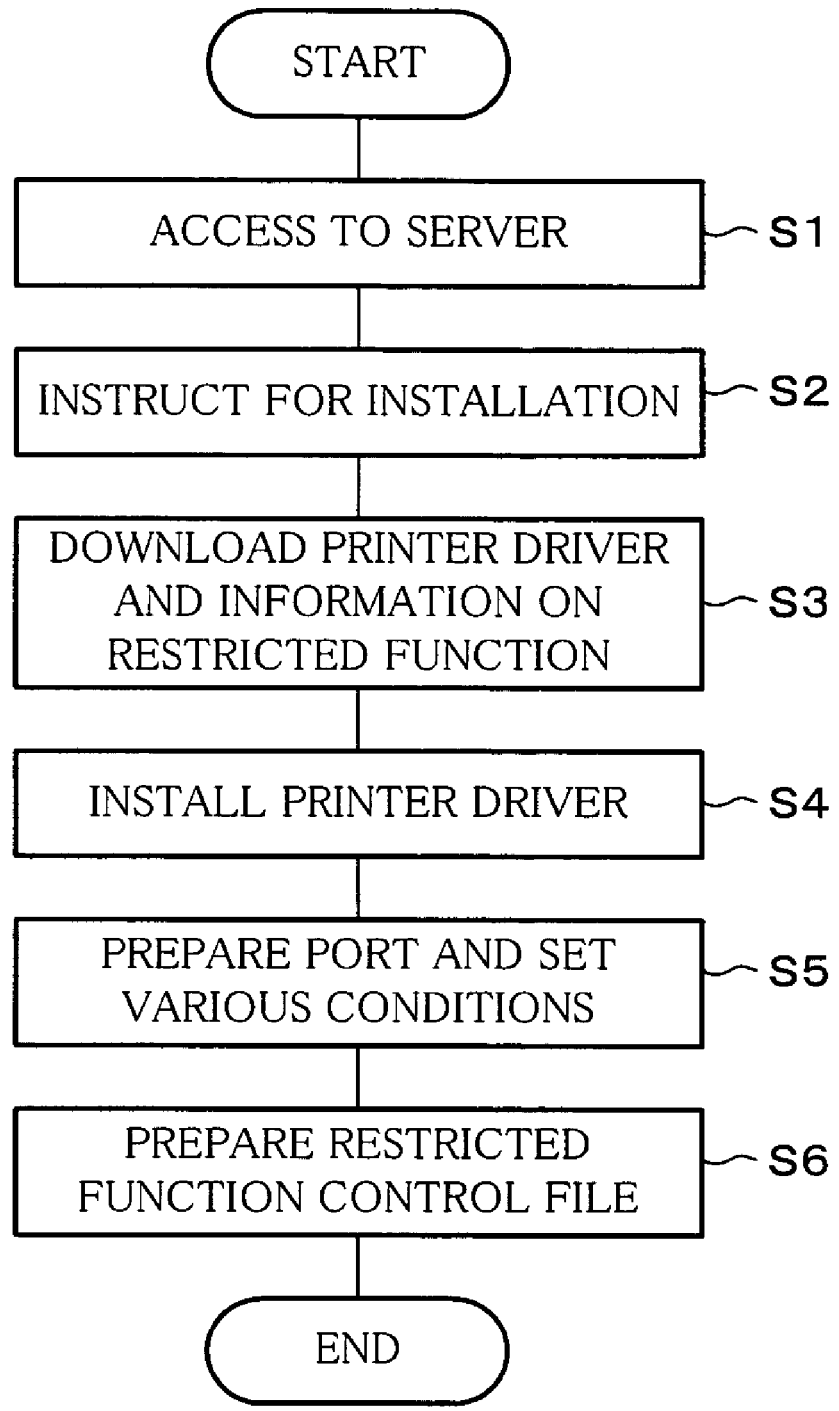
FIG. 5 is a flowchart that explains an operation of installing a printer driver in the host computer from the server.

The foregoing operations will be explained in reference to the flowcharts of FIGS. 5 and 6. Firstly, when installing the printer driver in the host from the server 10 shown in FIG. 1, as illustrated in FIG. 5, the host A makes an access to the server 10 in S1. The host A then makes a request for the installation of a printer driver stored in the server 10 in S2. In response, an installation program 15 in the HD 14 of the server 10 is executed, and the process of downloading the printer driver stored in the printer driver memory section 16 starts in S3. In the meantime, of all the information on restricted function stored in the printer driver control section 17, the information on restricted function related to the printer corresponding to the printer is starts being downloaded.

Next, the process of installing the printer driver as downloaded starts in S4. Upon completing the installation of the printer driver, a port is prepared by obtaining an IP address of the printer, and the initial setting of the printer driver, such as setting of a default in a printing process, etc., is performed in S5. A restricted function control file is then prepared based on the information on restricted function as downloaded from the printer driver control section 17 in S6.

Figure 6:
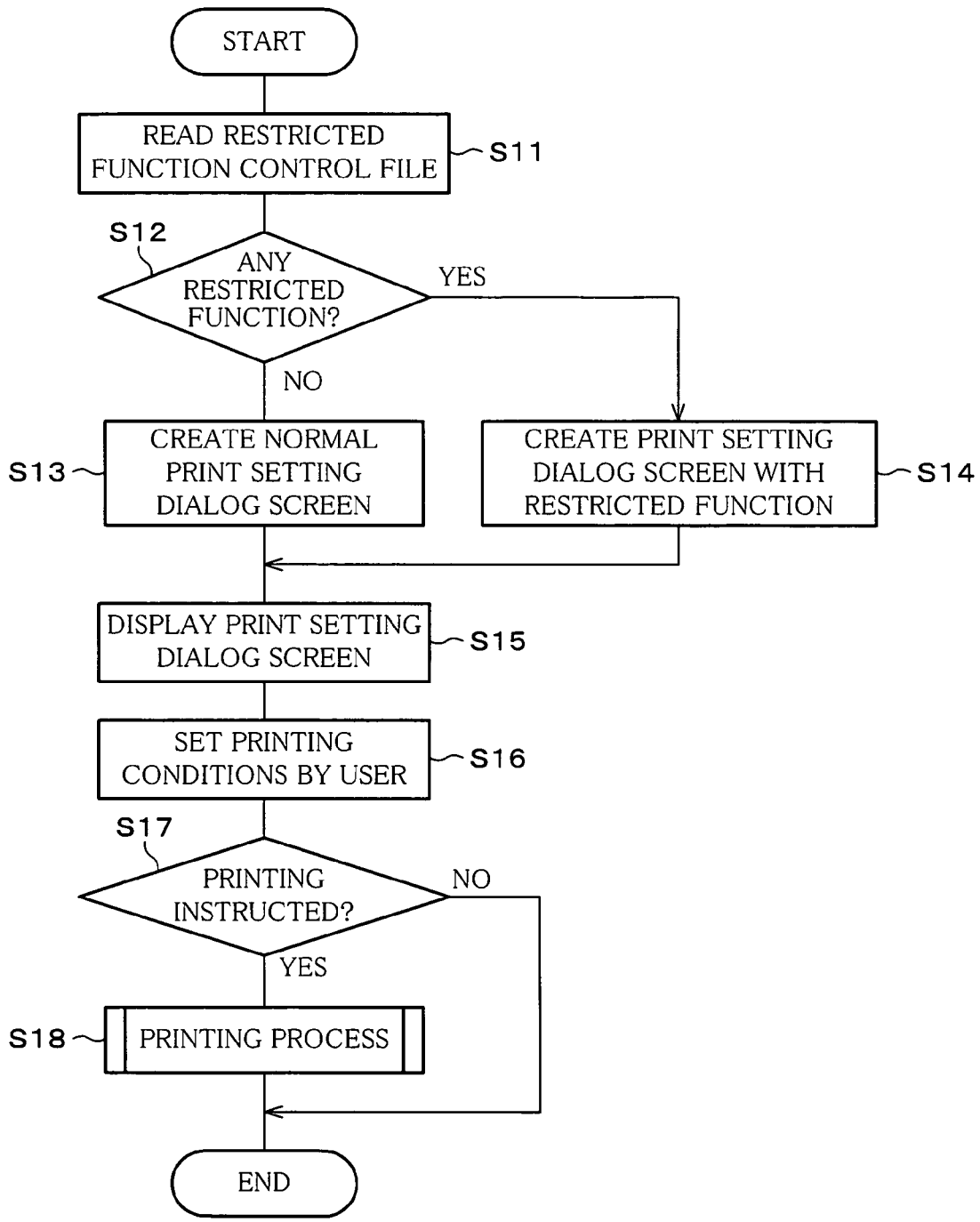
FIG. 6 is a flowchart that explains a printing control method of the present invention.

Upon activating the printer driver as installed in this order, in S11 of FIG. 6, the detecting section of the printer driver reads in the restricted function control file as stored in the restricted function control section 47. It is then determined in S12 if there exist any restricted function in the restricted function control file as read. If so in S12, the sequence goes to S14. In S14, a message informing the user of the restricted function is displayed as shown in FIG. 4, and a defining section of the printer driver creates a print setting dialog screen in which a print control section variable in the printing process is selectively displayed. On the other hand, if NO in S12, i.e., there exists no restricted function, the defining section creates a print setting dialog screen in which all the available print processing functions in the printer 20 are displayed as print controlling conditions.

After the print setting dialog screen is created in S13 or S15, the informing section of the printer driver displays the print setting dialog screen in the operating/display section 42 (FIG. 1) of the host A. The user then sets the printing conditions based on the display in respective print setting dialog in S16. Thereafter, it is determined if an instruction printing has been given from the user in S17. If so in S17, the sequence goes to S18, and the printing process is executed. On the other hand, if it is determined in S17 that the printing instruction has not been given, the foregoing sequential operation is completed.

In the present embodiment, explanations have been given through the case where the host A installs the printer driver of the printer 20. However, the foregoing explanations can be applied to the case of installing the printer driver of the printer 30. Also for the hosts B to E, the printing conditions in the printing process can be set using the print processing functions that are not restricted to use by carrying out the foregoing steps.

In the present embodiment, when the printer driver is downloaded in the host A from the server 10, the information on restricted function is downloaded at the same time, and the information on restricted function is transmitted to the host A from the server 10. As a result, the information on restricted function as set by the manager, etc., in the server 10 can be updated in every predetermined period. By updating the information on restricted function, the print controlling condition as defined in the host A can be modified.

As described, generally the printer driver installed in each of the hosts A to E is the same. Therefore, it is not possible to restrict the print processing functions for each of the host A to E merely by installing the printer driver in each of the hosts A to E. According to the present embodiment, the printer driver is installed, and the information on restricted function related to the print processing function that is restricted to use for each of the hosts A to E is downloaded. Therefore, by reading in the unique information on restricted function defined for each of the hosts A to E by the printer driver, it is possible to define the print controlling condition for each of the hosts A to E. As a result, it is possible to restrict the print processing functions available for the printing process for each of the hosts A to E, and the printing condition using the print processing function as desired by the user can be set.

Incidentally, the print controlling conditions are defined in the printer driver, and the user (hosts A to E) is informed of the print controlling conditions when setting the printing conditions of the printing process, to permit the user to select the print process function as desired. It is therefore possible for the user to set the print conditions as desired among the available print controlling conditions by setting the print conditions as desired.

Second Embodiment

The following descriptions will explain another embodiment of the present invention in reference to FIG. 7 to FIG. 11. For ease of explanation, members (structures) having the same functions as those shown in the drawings pertaining to the first embodiment above will be given the same reference symbols, and explanation thereof will be omitted here.

Figure 7:
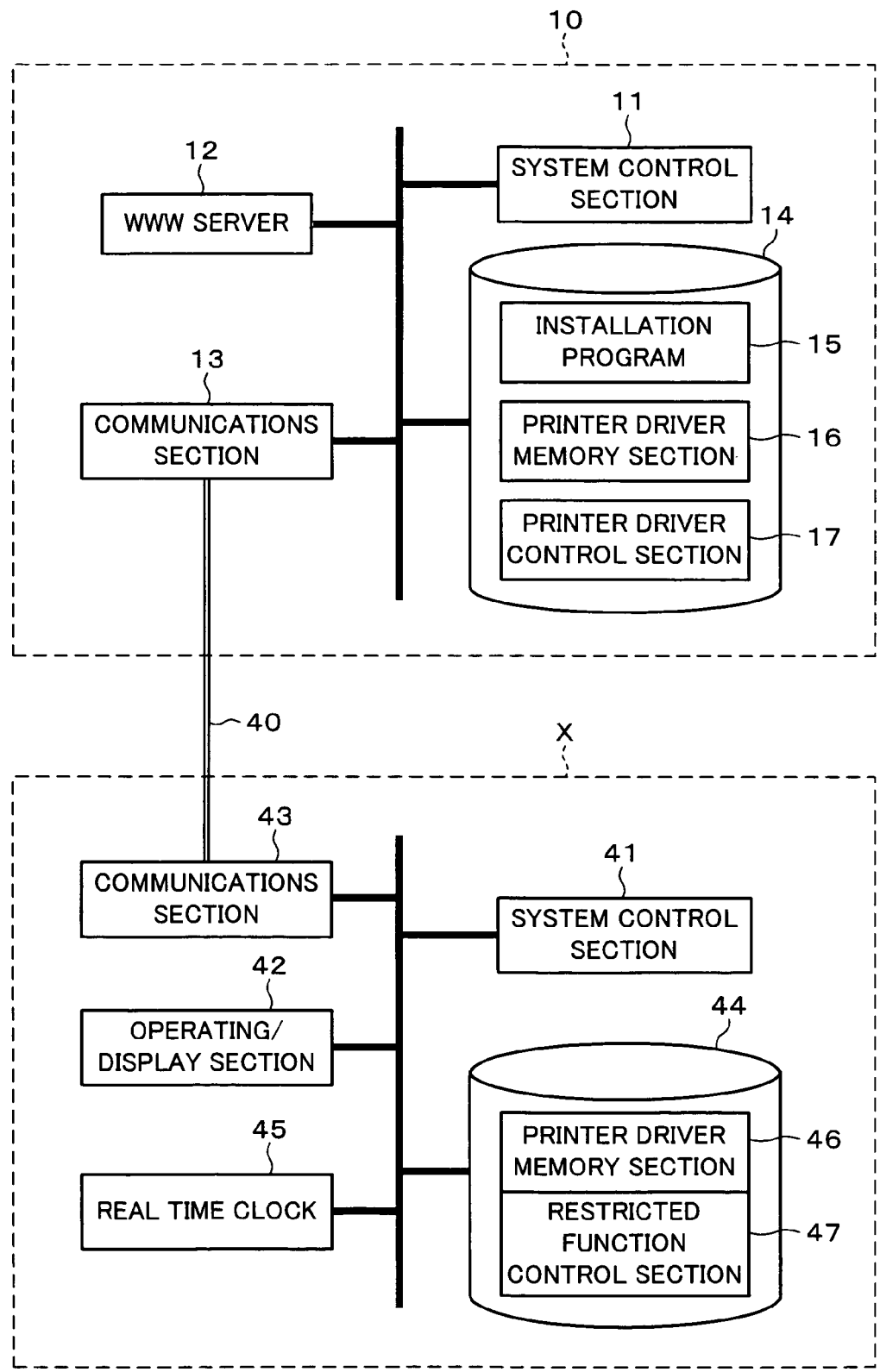
FIG. 7 is a block diagram of a server and a host, which constitute another printer network system of the present invention.

As illustrated in FIG. 7, the printer network in accordance with the present embodiment is provided with a host X in replace of the host A adopted in the first embodiment. The host X includes a real time clock (hereinafter referred to as RTC) 45 in addition to the structure of the host A shown in FIG. 1. This RTC 45 controls a calendar (time, date, week, month, etc.). Each of the hosts B' to E' having the foregoing embodiments includes the RTC 45 in addition to the structure of the host B to E adopted in the first embodiment respectively. In the following, explanations will be given through an example of the host X; however, the explanations can be applied also to the hosts B' to E'.

In the printer driver control section 17 of the HD 14 provided in the server 10 shown in FIG. 7, stored is a control table as shown in FIG. 8(*a*). Namely, in the control table of FIG. 8(*a*), for the information on restricted function, the permitted number of times of use of the print processing function of the printer 20 or 30 (hereinafter referred to as usable number of times) is managed. Specifically, the printing process to be carried out with respect to the recording sheets stored in the feed tray 4 of the printer 20 is permitted up to 20 sheets for the hosts X and B', and up to 10 sheets for the hosts C' and D'. The printing process of the feed tray of the printer 20 is prohibited for the host E' (0 page/month).

On the other hand, as shown in FIG. 7(*a*), the color printing process at the printer 30 is permitted up to 50 sheets per month for the hosts X and B', up to 30 sheets for the host C', and up to 20 sheets for the host D', and the color printing process is prohibited for the host E' (0 page per month).

As described, in the present embodiment, the number of times of use of the printing process using the feed tray 4 of the printer 20 is restricted by the number of sheets per month, and the number of sheets for the color printing in the printer 30 is restricted by the number of sheets per month. With the foregoing restricted functions, when the number of sheets to print per month is within the permissible range, respective printing processes in the printer 20 or 30 are executed; on the other hand, when the number of sheets to print per month becomes equal to or greater than the upper limit, the printing processes in the printer 20 or 30 are not executed.

The information on restricted function with regard to the usable number of times as managed in the control table shown in FIG. 8(*a*) is downloaded in the host X when downloading the printer driver in the host X as explained in the first embodiment. The restricted function control file is then prepared based on the information on restricted function with regard to the usable number of times.

Here, the restricted function control file prepared by the host X is stored in a table, for example, as shown in FIG. 8(*b*). Namely, the detecting section (not shown) of the printer driver controls the information on restricted function with regard to the usable number of times for each of the printers 20 and 30. The detecting section of the printer driver also controls the print processing function that can be used in a restricted number of times by counting the number of times that function actually used. Specifically, according to the table shown in FIG. 8(*b*), the number of sheets printed in the printing process using the feed tray 4 of the printer 20 by the printing process of the printer 20 in response to an instruction from the host X is 11. Similarly, the number of sheets to color print in the printer 30 in response to an instruction from the host X is 37.

As described, after the printer driver is installed and a request for the printing process is given with respect to the printer 30 from the host X in which the restricted function control file of FIG. 8(*b*) is prepared, the printer driver in the host X operates in the following manner. Namely, in response to the request for the printing process given with respect to the printer 30 from the application software of the host X, etc., the printer driver is activated, and the printer driver reads in the restricted function control file as stored in the restricted function control section 47 (FIG. 7). When adopting the printer 30, the print processing function subjected to the restricted usable number of times is confirmed, and a performance value for respective print processing function is also confirmed. As a result, using the print processing function subjected to the restricted usable number of times, it is possible to confirm the number of sheets printed in this month using the print processing function subjected to the restricted usable number of times.

As illustrated in FIG. 8(*b*), according to the present embodiment, the color print in the printer 30 is permitted up to 50 sheets per month, and the performance value in this month is 37 sheets. Namely, according to the restricted function control file of FIG. 8(*b*), the performance value in this month is within the usable number of times, and the color printing is therefore permitted. With the permission for the color print, the defining section of the printer driver creates a print setting dialog screen, and with a notification from the informing section, the print setting dialog screen is displayed in the operating/display section 42 of the host A.

Figure 9:
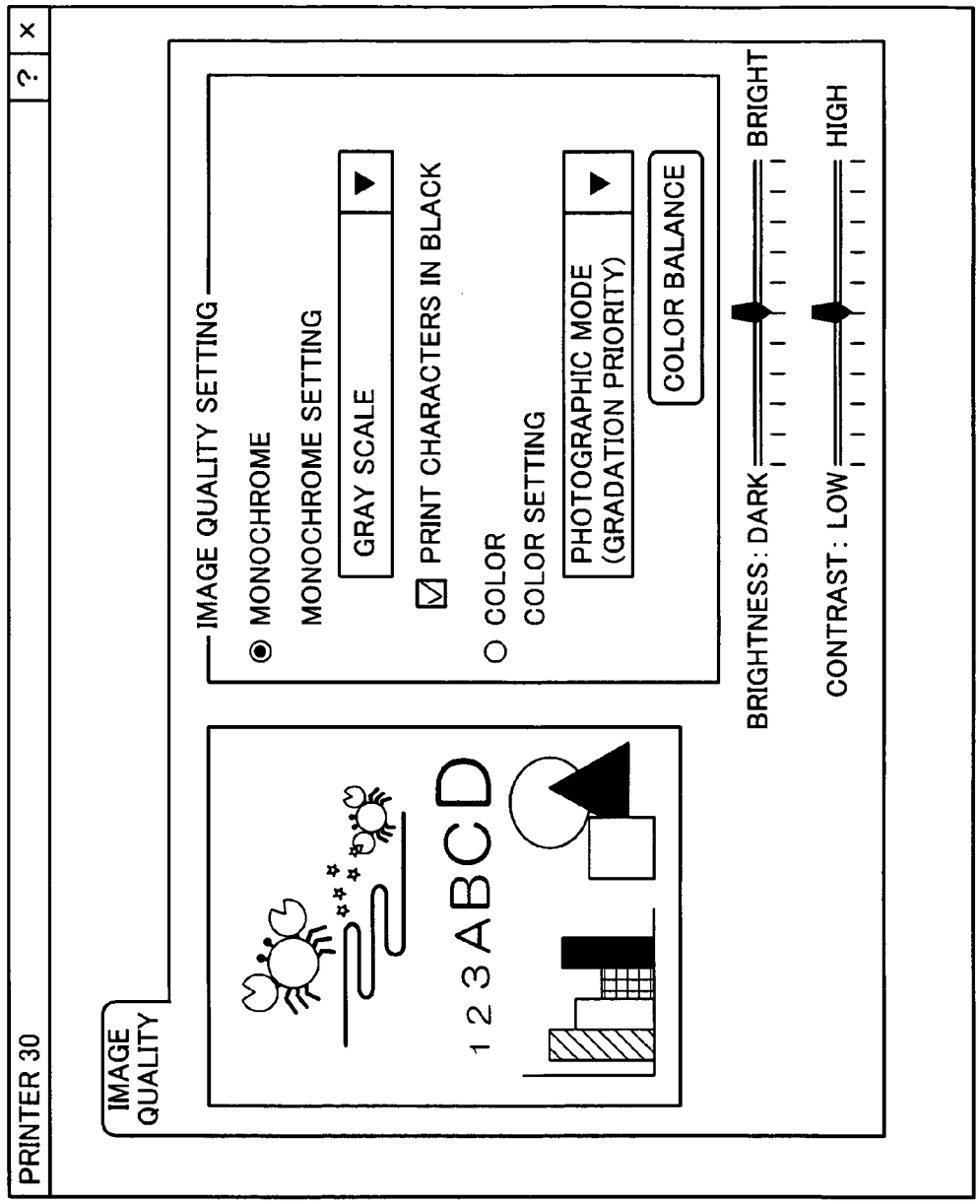
FIG. 9 is a plan view showing another print setting dialog screen created by a printer driver installed in the host computer.

Specifically, as illustrated in FIG. 9, the print setting dialog screen for setting image quality, for example, brightness, contrast of an image, color printing, monochrome printing, etc. is displayed to allow the user to select conditions for color print. Based on the print setting dialog screen shown in FIG. 9, the user sets printing conditions as desired for the printing process to be performed in the printer 30. For example, in the case where the user selects the option for the color print in the printer 30, and the color print is actually executed based on the option selected by the user, the performance value is updated by adding the number of color printed sheets to the performance value in the table.

For the performance value shown in the table of FIG. 8(*b*), the number of sheets printed is added as a performance value for a predetermined period (one month in the present embodiment). Then, the usable number of times set beforehand is compared with the performance value, and when the performance value becomes not smaller than the usable number of times, the following operation will be performed.

Figure 10:
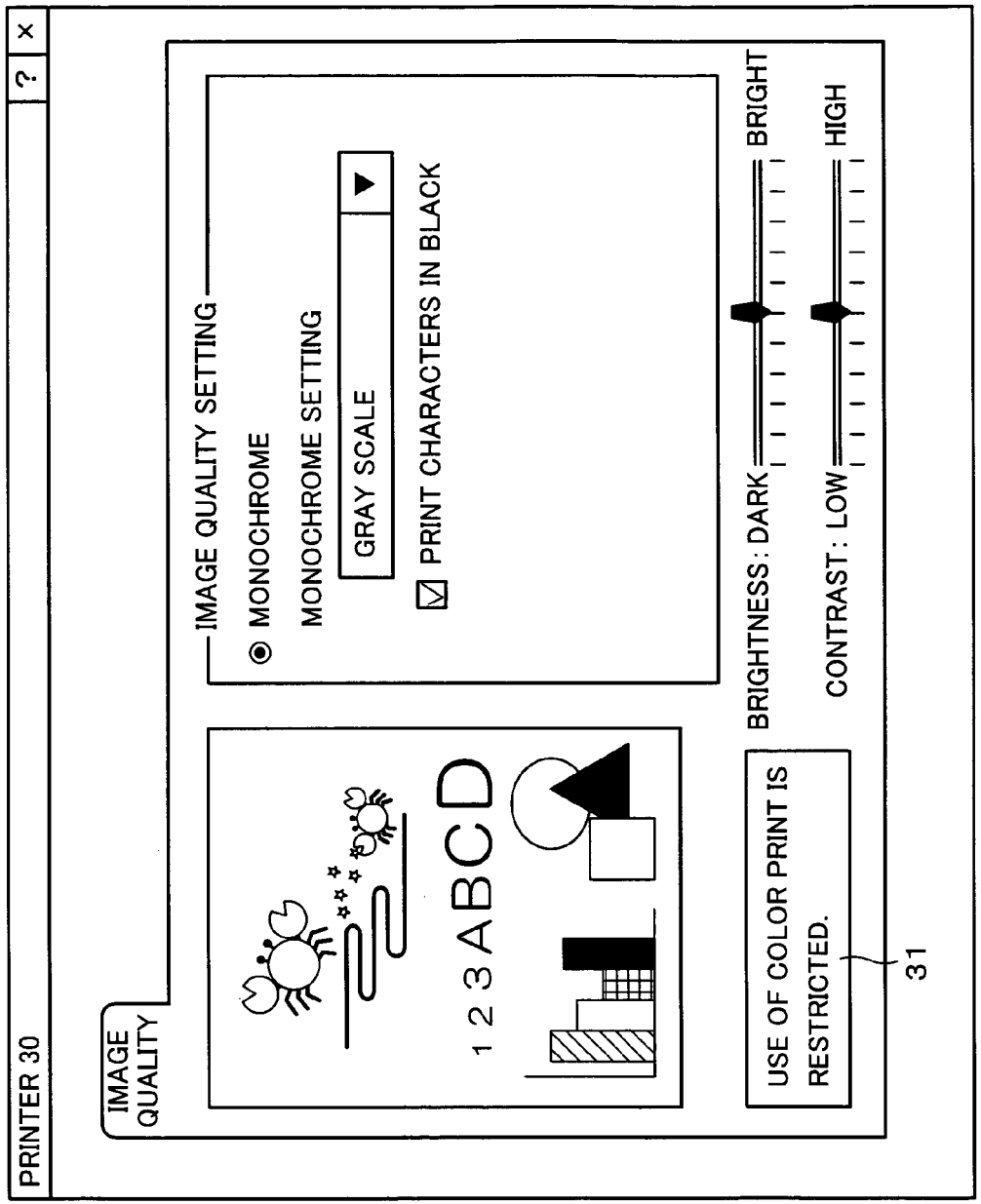
FIG. 10 is a plan view showing still another print setting dialog screen created by a printer driver installed in the host computer.

Namely, the usable number of times is compared with the performance value, and if the performance value in this month is not smaller than the usable number of times, the color printing process is restricted. Therefore, as illustrated in FIG. 10, in the operating/display section 42 of the host A, a message indicative of that "the color printing is restricted." is displayed in the print setting dialog screen in the message region 31. In the print setting dialog screen in FIG. 10, set conditions for color printing are not displayed, and the set conditions for monochrome printing that are not restricted to use are displayed. Namely, according to the present embodiment, the informing section of the printer driver informs the user by the print setting dialog screen of FIG. 10 of the print processing functions that have not been used as many times as the usable number of times so as to prevent the user from selecting the print processing function which has already used the set usable number of times.

Therefore, the user can recognize by the print setting dialog screen of FIG. 10 that the color printing using the printer 30 is not permitted, and the user can decide whether or not to perform the monochrome printing process.

According to the present embodiment, conditions to be set for color printing that are restricted to use are not displayed in the print setting dialog screen; however, as explained in the first embodiment, the conditions to be set for color printing that are restricted to use may be gray out displayed.

According to the present embodiment, the usable number of times as set is compared with the performance value to determine if the print processing function is available in the printing process. However, the present invention is not intended to be limited to this. For example, it may be arranged so as to check if the usable number of times remaining after subtracting the number of times actually used from the usable number of times is zero to determine if the print processing function is available in the printing process.

The information on date and time is managed in the RTC 45 (FIG. 1) of the host X. Therefore, based on the information on date and time, the defining section of the printer driver resets a performance value managed in the restricted function control file in FIG. 8(*b*) when a predetermined time has passed (one month has passed in the present embodiment). In the present embodiment, by resetting the performance value, the performance value is set to zero. As a result, the print processing function that has already been used as many times as the usable number of times becomes available again, and that function can be used within the usable number of times as set.

Figure 11:
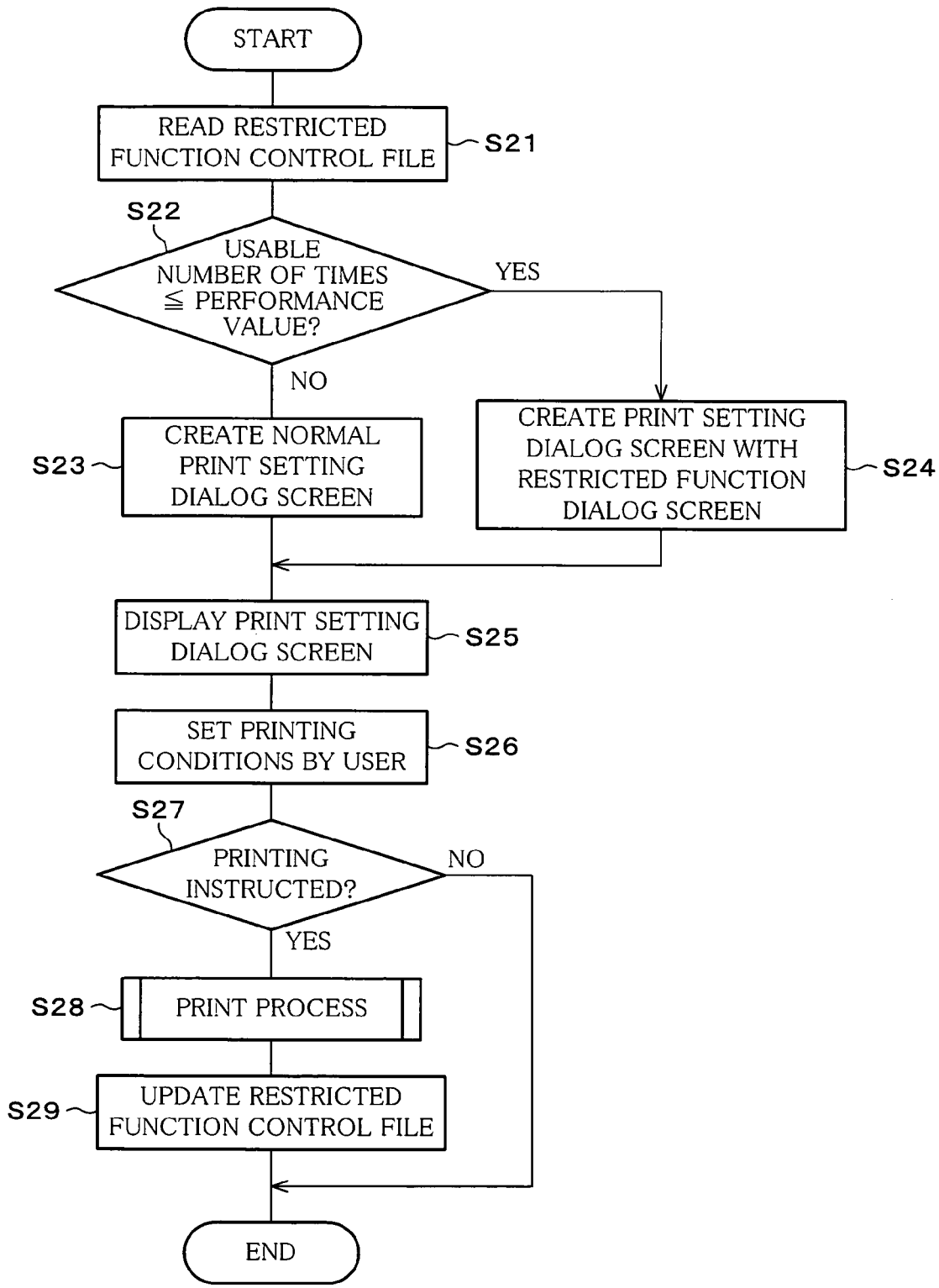
FIG. 11 is a flowchart that explains another printing control method of the present invention.

Next, when the number of sheets to print in the printing process in a month is restricted as in the above example, the operations performed by the printer driver will be explained in reference to the flowchart shown in FIG. 11. When activating the printer driver installed in the host X from the server 10 of FIG. 7, the restricted function control file (FIG. 8(*b*)) stored in the restricted function control section 47 is read in S21. Then, it is determined in S22 if the performance value managed in the restricted function control file as read is not smaller than the usable number of times. If it is determined that the performance value is not smaller than the usable number of times in S22, the sequence goes to S24.

As illustrated in FIG. 10, a display is made in S24 to inform the user of the function for which a performance value is not smaller than the usable number of times, and the defining section of the printer driver creates a print setting dialog screen in which print controlling conditions that can be set in the printing process is displayed. In contrast, if it is determined in S22 that the performance value is smaller than the usable number of times, the defining section of the printer driver creates a print setting dialog screen in which all the print processing functions that can be set in the printer 30 are displayed as print controlling conditions in S23.

After the print setting dialog screen is created in S23 or S24, the print setting dialog screen is displayed in the operating/display section 42 in S25. It is then determined if an instruction for printing is given by the user in S27. If it is determined in S27 that an instruction for printing is given by the user, a sequence goes to S28, and the printing process is executed, and the sequence further goes to S29. In this case, if the print processing function subjected to restriction is executed, a performance value managed in the restricted function control file is updated. On the other hand, if it is determined in S27 that an instruction for printing is not given by the user, a sequential operation is completed.

As described, by reading the information on restricted function with regard to the usable number of times as information on restricted function by the printer driver, it is possible to restrict the print processing function(s) available in the printing process based on the usable number of times of a predetermined print process function. It is therefore possible to restrict the usable number of times of a predetermined print processing function for each of the hosts X, and B' to E' by transmitting the information on restricted function with regard to the usable number of times set, for example, by a manager from the server 10 to each of the hosts X, and B' to E'.

Third Embodiment

Figure 12:
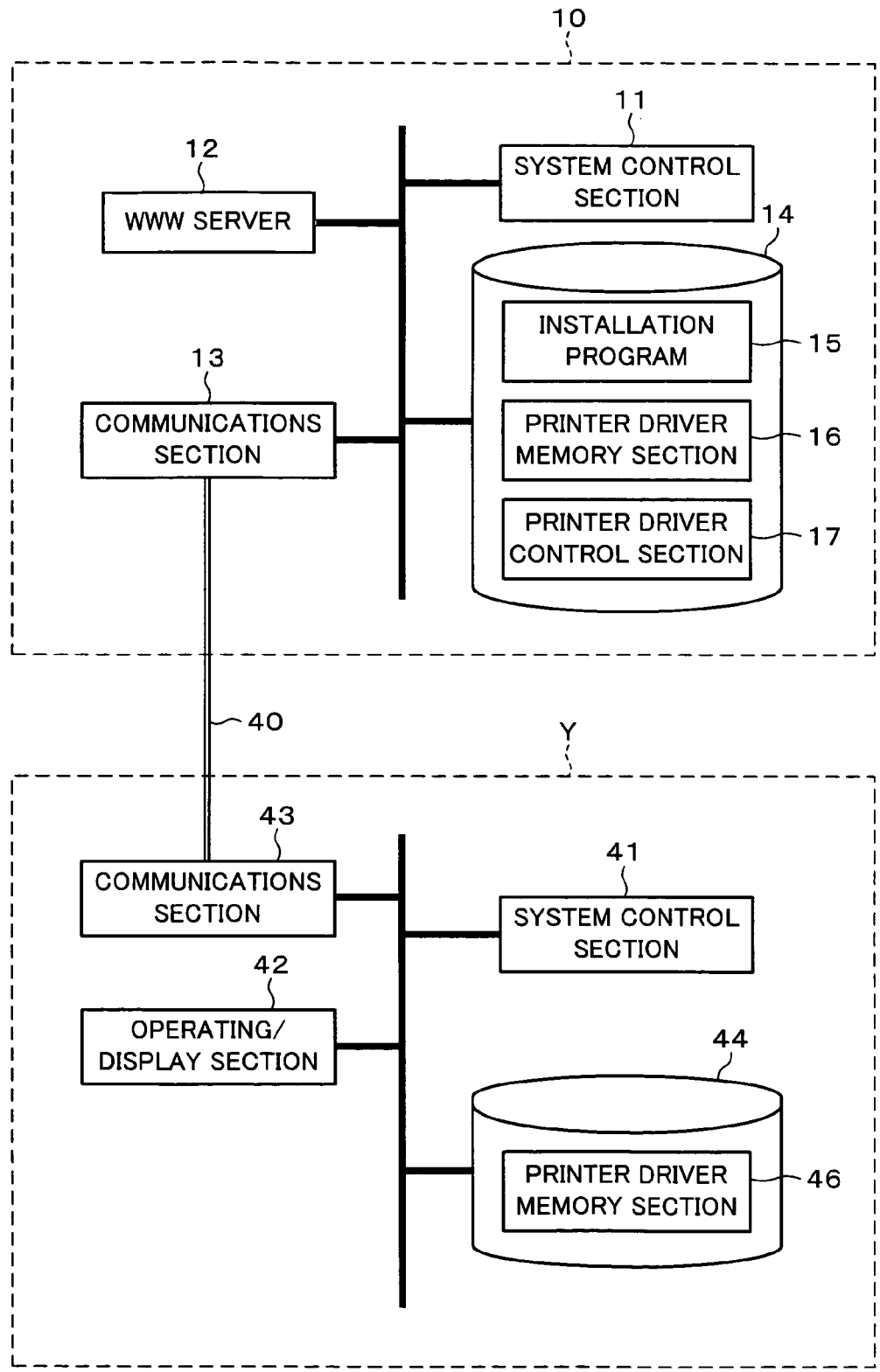
FIG. 12 is a block diagram of a server and a host that constitute still another printer network system of the present invention.

The following descriptions will explain still another embodiment of the present invention in reference to FIG. 12. For ease of explanation, members (structures) having the same functions as those shown in the drawings pertaining to the first and second embodiments above will be given the same reference symbols, and explanation thereof will be omitted here.

In the foregoing first and second embodiments, explanations have been given through the case of installing the printer driver having all the functions from the server 10 the host A or X. In the present embodiment, explanations will be given through the case of installing a function module having a specific print processing function in replace of the printer driver having all the print processing functions.

Specifically, as illustrated in FIG. 12, the printer network system of the present embodiment is provided with a host Y in replace of the host A adopted in the first embodiment. The host Y basically has the same structure as the host A except that the restricted function control section 47 in the HD 44 of the host A is not provided.

According to the printer network system having the foregoing structure of the present embodiment, with respect to the host Y from the server 10, for example, an operation of installing the printer driver of the printer 30 is performed in the following manner. Namely, via the LAN 40, the host A makes an access to the server 10, and makes a request for installing the printer driver of the printer 30. In response to this request, the installation program 15 stored in the HD 14 of the server 10 is executed.

Based on the information on restricted function (FIG. 3) stored in the printer driver control section 17 of the server 10, it is controlled so as to install the function module (printer driver module) related to the print processing function that is not restricted when the host Y uses the printer 30, and not to install the function module related to the restricted print processing function. For example, in the case where the color print is restricted when the host Y uses the printer 30, it is controlled so as not to install the color printing function module in the host Y.

As described, according to the present embodiment, when installing the printer driver, based on the information on restricted function (FIG. 3) stored in the printer driver control section 17 of the server 10, only the specific function module is installed. In this way, when the printer driver is activated in the host Y, based on the function module as installed, the print setting dialog screen is created based on the function module as installed in the operating/display section 42 of the host Y.

Namely, as described above, in the case where the color printing function module is not installed as being restricted to use, for example, as shown in FIG. 10, a print setting dialog screen in which conditions to be set for color printing are not displayed is created. In this way, the user can recognize that the color printing in the printer 30 is not available by the print setting dialog screen shown in FIG. 10.

As described, when installing the printer driver, it is possible to restrict a predetermined print processing function for each host by installing only the function module which is not restricted to use. According to the foregoing structure, the print controlling function can be restricted based on the function module as installed, and it is therefore possible to omit the detecting section for detecting the function control file and the print controlling condition adopted in the first embodiment.

It is unnecessary that the host Y of the present embodiment is provided with the restricted function control section 47 of the host A of the first embodiment for the following reasons. That is, in the present embodiment, the development of the print setting dialog screen is carried out not by reading the restricted function control file by the printer driver, but based on the function module as installed. Therefore, as explained in the first embodiment, the printer driver is installed, and it is not necessary to install the printer driver nor down load the information on restricted function as stored in the printer driver control section 17.

According to the present embodiment, the print processing function is restricted based on whether or not a specific function module is installed. Therefore, the present embodiment is preferably adopted in the case of restricting the print processing function based on with or without the module. Examples of the print processing function that is restricted to use based on whether or not the function module is provided include: a color printing function, a monochrome printing function, a stapling process of recording material having gone through the printing process.

The printer driver in accordance with the present embodiment is a program as a program code itself that can be executed directly by the arithmetic means such as CPU, etc., or data for generating the program code by the uncompressing process to be described later. This program (program code or data) is supplied by distributing the recording medium storing the program, or transmitting the program by the communications means via the radio or wireless communications path, to be executed by the arithmetic means.

Incidentally, when transmitting via the communications path, respective transmission media which constitute the communication path transmit signal strings indicative of the program each other, and the program is transmitted via the communications path. Incidentally, it may be arranged such that when transmitting the signal string, the transmitting device modulates the carrier wave by the signal strings indicative of the program, the signal string is superimposed on the carrier wave. In this case, by modulating the carrier wave by the receiving device, the signal string is modulated. On the other hand, it may be arranged such that when transmitting the signal string, the transmission device divides the signal string as digital data string as packets. In this case, the receiving device decompresses the packet group as received to demodulate the signal string. Incidentally, when the transmission device transmits the signal string, the signal string may be multiplexed with other signal string by the time-division/frequency division/code division method. In any case, by transmitting the program via the communication path, the same effects can be obtained. In this case, the receiving device modulates respective signal liens form the multiplexed signal strings by extracting respective signal strings. In any case, by transmitting the program via the communications path, the same effects can be obtained.

Here, it is preferable that the recording medium for use in distributing the program be detachable; however, the recording medium after distributing the recording medium is not necessary be detachable. As long as the program is stored, the recording medium is not particularly limited as to whether or not re-writable, volatile or un-volatile, the recording method and the shape. Examples of the recording medium include a magnetic tape, a cassette tape, or other tape, a floppy (registered trademark) disk, a hard disk, or other magnetic disk, or a CD-ROM, a magneto-optical disk (MO), a mini-disk (MD), a digital disk (DVD) or other disk. A recording medium may be an IC card, an optical card or other card, a mask ROM, EPROM, EEPROM or flush ROM or other semiconductor memory, or may be a CPU or mother memory in the arithmetic means.

The program codes may be arranged so as to instruct all the steps in each process to the arithmetic means. If there exists a basic program, which permits a part or all of the steps in each process already exits (for example, an operating system or library, etc.), the part or all of the steps may be replaced using codes or a pointer for instructing the arithmetic means to call for the basic program.

The foregoing program may be stored in the recording medium, for example, in such a manner that the arithmetic means can access and execute the program, for example, in real memory, or may be stored in a system before being installed in the real memory and after being installed in a local recording medium (real memory, hard disk, for example), where the arithmetic means can access, or in a system before being installed in the local recording medium from the network or the transportable recording medium. Incidentally, for the program, not only the object codes after being complied, but also source codes or interpret or intermediate codes generated while being compiled may be adopted. As long as the program can be converted to be executable by the arithmetic means by combinations of the compressed data, decoding of the coded data, interpret, compile, link, or the arrangement in real memory, etc., the same effect of the present invention can be achieved irrespectively of the storage system of the program in the recording medium.

Although the invention has been described in association with preferred embodiments, it will be understood that various modifications are applicable within the scope of claims, and that combinations of technical means disclosed in different embodiments are also applicable within the scope of claims.

In each of the foregoing preferred embodiments, the detecting section, the defining section and the informing section are realized by the cooperative working of the computer (CPU and memory) and the printer driver which makes the computer function as the detecting section and the defining section and the informing section.

However, the detecting section, the defining section and the informing section may be realized by hardware. The host computer A in accordance with the present embodiment may be arranged so as to include the detecting section, the defining section and the informing section realized by hardware in replace of the printer driver memory section 46, the CPU and the memory storing the printer driver.

As described, the printing control system of the present invention, provided with a printing device and a printing control device for controlling a printing process to be executed by the printing device, is arranged such that:

the printing control device includes:

a storage section which stores therein information on restricted function for restricting a use of a print processing function of the printing device;

a detecting section for detecting the information on restricted function; and a defining section for defining as a print controlling condition, a print processing function available in the printing process based on the information on restricted function as defected by the detecting section.

As described, the printing control system having the foregoing structure of the present invention may be arranged such that:

the printing control device is an information processing device having installed therein a printer driver for controlling a printing process to be executed by the printing device; and the printer driver includes the detecting section and the defining section. Namely, the printing control system of the present invention for controlling a printing process to be executed by the printing device by the printer driver installed in the information processing device is arranged such that the information processing device includes: a storage section which stores therein information on restricted function for restricting a use of a print processing function of the printing device; a detecting section for detecting the information on restricted function; and a defining section for defining as print controlling conditions, the print processing function available in the print processing based on the information on restricted function as defected by the detecting section.

According to the foregoing structure wherein the printer driver defines the printing control conditions based on the information on the restricted function, it is possible to define the print controlling condition with predetermined restricted function for each information processing device. Namely, it is possible to set the print controlling condition defined by the printer driver reflecting the information on restricted function as stored in the information processing device. As a result, the printing process to be executed by the printing device can be restricted by the printer driver for each information processing device.

In other words, according to the foregoing structure, the printer driver detects the information on the restricted function as stored in the information processing device, thereby providing the defects of defining the print controlling conditions. As a result, it is possible to restrict the printing condition to be executed at the printing device for each information processing device.

Incidentally, according to the foregoing structure, the printer driver defines the print controlling conditions reflecting the information on the restricted function. The user of the printing control device can recognize the print processing conditions available in the printing process without restriction and restricted print processing conditions by confirming the print controlling condition. It is therefore possible for the printer driver to control the printing process at the printing device so as to execute a printing process as desired by the user based on at least one option selected by the user among the available printing process conditions.

In other words, according to the foregoing structure, it is possible for the user of the information processing device to recognize the print processing conditions available in the printing process without restriction and restricted print processing conditions by confirming the print controlling condition defined by the printer driver. It is therefore possible for the printer driver to control the printing process at the printing device so as to execute a printing process as desired by the user based on at least one option selected by the user among the available printing conditions.

The printing control system having the foregoing structure may be further arranged such that the information processing device is connected to a server for controlling the printer driver and the information on restricted function via a network; and the server provides the information processing device with the printer driver and the information on restricted function.

According to the foregoing structure, the server controls the information processing device to be capable of providing the information processing device with the printer driver of the printing device. According to the foregoing structure, it is possible for the server to set the information on the restricted function, for restricting the print processing functions of the printing device for each information processing device. Furthermore, by providing the information processing device with the information on the restricted function as set together with the printer driver, it is possible to restrict a predetermined print processing function based on the information on the restricted function when executing the printing process as requested from each information processing device. It is therefore possible to change the printing control conditions as defined by the printer driver by changing the setting of the information on the restricted function for each information processing device. As a result, it is possible to change the print controlling conditions defined by the printer driver for each information processing device without installing the printer driver having different print controlling conditions.

In other words, it is possible for the server to change the print controlling conditions as defined by the printer driver by changing the setting of the information on the restricted function for each information processing device. As a result, it is possible to set a different print controlling conditions to be restricted to use for each information processing device by changing the information on the restricted function despite that the same printer driver is installed in each information processing device.

The printing control system of the present invention having the foregoing structure may be further arranged such that the storage section stores as the information on restricted function, information on restricted usable number of times in which a usable number of times of the print processing function of the printing device is set; the detecting section detects the information on restricted usable number of times, and counts a number of times used of the print processing function subjected to a restriction on the usable number of times; and the defining means defines the print controlling condition based on the information on restricted usable number of time and the number of times used as counted by the detecting means.

According to the foregoing structure, the printer driver defines the print controlling conditions based on the information on restricted usable number of times and the number of times counted by the detecting means. As a result, it is possible to offer the effect of defining the print controlling conditions according to the usable number of times of the print processing function to control the printing process at the printing device.

The printing control system of the present invention having the foregoing arrangement is arranged such that the printer driver further includes an informing section for informing to prevent the print processing function that is restricted to use in the printing process from being selected.

According to the foregoing structure, it is possible for the user to recognize the print processing function that is restricted to use (hereinafter referred to as restricted function). Furthermore, the user is informed of the restricted function so as to be un-selectable, and it is therefore possible to prevent such problem that the user requests the printing device for the printing process with the restricted function. As a result, the user's operability and the operability of the printing device can be improved by preventing a request for printing with an unavailable function with the restriction on the function.

The print controlling system of the present invention having the foregoing structure may be further arranged such that the informing section informs the user of the print processing function that has not been used as many times as the usable number of times so as to prevent the user from selecting the print processing function already used as many times as the usable number of times in the printing process.

According to the foregoing structure, as the user is informed of the restricted function, the user can recognize the restricted function. Furthermore, the user is informed in such a manner that the restricted function is un-selectable. It is therefore possible to prevent such problem that the user requests the printing device for the printing process with the restricted function. As a result, the user's operability and the operability of the printing device can be improved by preventing a request for printing with an unavailable function with the restriction on the function.

The printing control device of the present invention is arranged such that the defining section resets the defining section resets the number of times used when a predetermined period has passed.

According to the foregoing structure, the defining section resets the number of times used when a predetermined period has passed. With this structure, it is possible to reset the print processing function which has been used as many times as the usable number of times to be usable after the predetermined time has passed.

As described, the print controlling system of the present invention which controls a printing process to be executed by a printing device by installing therein a printer driver in an information processing device from the server via the network, wherein:

the printer driver includes a printer driver module corresponding to each print processing function of the printing device; and the server has the printer driver and a control section which controls the information on restricted function for restricting a use of the print processing function of the printing device, and provides the information processing device with the printer driver module having a specific print processing function based on the information on restricted function.

According to the foregoing structure, the printer driver module as supplied from the server to the information processing device is determined based on the information on the restricted function. With this structure, as the printer driver module is installed in each information processing device based on the information on restricted function, the printing process to be executed at the printing device in response to the request from the information processing device is restricted by the print processing function according to the printer driver module. Namely, by installing the specific printer driver module from the server, it is possible to restrict the printing process to be executed in the print processing device according to the printer driver module.

As described, the printing control method of the present invention, for controlling a printing device by a printer driver installed in an information processing device, is arranged so as to include:

a detecting step for detecting information on restricted function for restricting a print processing function of the printing device as stored in the information processing device; and a defining step for defining as print controlling conditions the print processing function available in the printing process based on the information on restricted function as detected in the detecting step.

According to the foregoing method wherein the information on the restricted function is stored in the information processing device, it is possible to define the printing control conditions with a predetermined restricted print processing function for each information processing device. It is therefore possible by the printer driver to restrict the printing process to be executed in the printing device for each information processing device. It is therefore possible for the printer driver to control the printing process at the printing device so as to execute a printing process as desired by the user based on at least one option selected by the user among the available printing process conditions.

The printing control method of the present invention having the foregoing structure, is arranged such that the information processing device is connected to a server which controls the printer driver and the information on restricted function via a network;

the printing control method further comprising:

an obtaining step for obtaining by the information processing device the printer driver and the information on restricted function controlled by the server.

According to the foregoing method, the server sets the information on restricted function for restricting the print processing function of the printing device, for each information processing device. It is therefore possible to set a different print controlling condition for each information processing device.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A printing control device connected to a printing device via a network, for controlling a printing process to be executed by said printing device, comprising:

a storage section for storing information on restricted function for restricting a use of a print processing function of said printing device;

a detecting section for detecting the information on restricted function;

a defining section for defining as a print controlling condition, a print processing function available in the printing process based on the information on restricted function as detected by said detecting section;

said printing control device being realized by an information processing device including a computer, wherein:

said information processing device has installed therein a printer driver for controlling a printing process to be executed by said printing device; and said printer driver makes said computer function as said detecting section and said defining section.

2. The printing control device as set forth in claim 1, wherein:

the information on restricted function is provided for restricting a use of at least one of a plurality of print processing functions of said printing device, said printing control device, comprising: a user interface which permits a user to select a desired print processing function from said plurality of print processing functions of said printing device; and a user interface control section for modifying said user interface based on the information on restricted function stored in said storage section so that a print processing function that is restricted to use cannot be selected.

3. The printing control device as set forth in claim 2, wherein:

said information on restricted function can be set based on the print processing function obtained from said printing device.

4. The printing control device as set forth in claim 2, wherein:

said user interface is arranged so as to permit the user to select a desired print processing function from a plurality of print processing functions that are not restricted to use even in a case where one of said plurality of print processing functions is restricted to use.

5. The printing control device as set forth in claim 2, wherein:

said user interface includes a display device for displaying said plurality of print processing functions of said printing device as options, and an input device for permitting a user to select a desired print processing function from the options as displayed in said display device; and said user interface control section alters a display in the display device based on the information on restricted function stored in said storage section so as to prevent display as a selectable option the print processing function that is restricted to use.

6. The printing control device as set forth in claim 1, wherein:

said information processing device is connected to a server for controlling said printer driver and said information on restricted function via a network; and said server provides said information processing device with said printer driver and the information on restricted function.

7. The printing control device as set forth in claim 1, wherein:

said printer driver further includes an informing section for informing a user of the print processing function available in the printing process so that said user cannot select the print processing function that is restricted to use in the printing process.

8. The printing control device as set forth in claim 1, wherein:

said storage section stores as the information on restricted function, information on restricted usable number of times in which a usable number of times of the print processing function of said printing device is set;

said detecting section detects the information on restricted usable number of times, and counts a number of times used of the print processing function subject to a restriction on the usable number of times; and said defining means defines the print controlling condition based on the information on the restricted usable number of times and a number of times used as counted by said detecting section.

9. The printing control device as set forth in claim 8, wherein:

said informing section informs the user of the print processing function that has not been used as many times as the usable number of times so as to prevent the user from selecting the print processing function already used as many times as the usable number of times in the printing process.

10. The printing control device as set forth in claim 8, wherein:

said defining section resets the number of times used when a predetermined period has passed.

11. A printing control system provided with a printing device, and a printing control device for controlling a printing process to be executed by said printing device, wherein:

said printing control device includes:

a storage section which stores therein information on restricted function for restricting a use of a print processing function of said printing device;

a detecting section for detecting the information on restricted function; and a defining section for defining as a print controlling condition, a print processing function available in the printing process based on the information on restricted function as detected by said detecting section, wherein: said printing control device is an information processing device having installed therein a printer driver for controlling a printing process to be executed by said printing device; and said printer driver includes said detecting section and said defining section.

12. The printing control system as set forth in claim 11, wherein:

said information processing device is connected to at least one server for controlling said printer driver and said information on restricted function via a network; and said server provides said information processing device with said printer driver and said information on restricted function.

13. The printing control system as set forth in claim 11, wherein:

said printer driver further includes an informing section for informing the user of the print processing function that is restricted to use in the printing process so as to prevent the user from selecting the print processing function that is restricted to use.

14. The printing control system as set forth in claim 11, further comprising:

an informing section for informing a user of the print processing function available in the printing process so as to prevent the user from selecting the print processing function that is restricted to use in the printing process.

15. The printing control system as set forth in claim 11, further comprising:

said storage section stores as the information on restricted function, information on restricted usable number of times in which a usable number of times of the print processing function of said printing device is set;

said detecting section detects the information on restricted usable number of times, and counts a number of times used of the print processing function subjected to a restriction on the usable number of times; and said defining means defines the print controlling condition based on the information on restricted usable number of time and the number of times used as counted by said detecting means.

16. The printing control system as set forth in claim 15, wherein:

said printer driver further includes an informing section for informing to prevent the print processing function which is restricted to use in the printing process from being selected.

17. The printing control system as set forth in claim 16, further comprising:

said informing section informs the user of the print processing function that has not been used as many times as the usable number of times so as to prevent the user from selecting the print processing function already used as many times as the usable number of times in the printing process.

18. The printing control system as set forth in claim 15, further comprising:

said informing section informs the user of the print processing function available in the printing process so as to prevent the user from selecting the print processing function already used as many times as the usable number of times in the printing process.

19. The printing control system, as set forth in claim 15, wherein: said defining section resets the number of times used when a predetermined period has passed.

20. The printing control system as set forth in claim 11, wherein: said printing device and said print controlling device are connected via a network.

21. A printing control method for controlling a printing process to be executed by a printing device using a printer driver installed in an information processing device including a computer, said printer driver causing said computer to execute said printing control method, said method comprising:

a detecting step for detecting information on restricted function for restricting a print processing function of said printing device as stored in said information processing device; and a defining step for defining as print controlling conditions the print processing function available in said printing process based on the information on restricted function as detected in said detecting step.

22. The printing control method as set forth in claim 21, wherein:

said information processing device is connected to a server which controls said printer driver and said information on restricted function via a network; and said printing control method further comprising: an obtaining step for obtaining by said information processing device said printer driver and said information on restricted function controlled by said server.

23. A printer driver installed in an information processing device including a computer, for controlling a printing process to be executed in a printing device connected to said information processing device via a network, said driver causing a computer to carry out the steps comprising:

a detecting step for detecting information on restricted function for restricting a print processing function of said printing device, stored in said information processing device; and a defining step for defining as a print controlling condition, the print processing function available in said printing process based on the information on restricted function detected in said detecting step.

24. A computer-readable recording medium having recorded thereon a printer driver to be installed in an information processing device including a computer, for controlling a printing process to be executed in a printing device connected to said information processing device via a network, wherein: said printer driver causes a computer to carry out the steps comprising:

a detecting step for detecting information on restricted function for restricting a print processing function of said printing device, stored in said information processing device; and a defining step for defining as a print controlling condition, the print processing function available in the printing process based on the information on restricted function detected in said detecting step.

* * * * *